US011027784B2

(12) United States Patent
Brereton et al.

(10) Patent No.: US 11,027,784 B2
(45) Date of Patent: Jun. 8, 2021

(54) AERODYNAMIC DEVICES FOR MOVING VEHICLES

(71) Applicant: INRANGE TECHNOLOGIES, LLC, Raleigh, NC (US)

(72) Inventors: Timothy Brereton, Rolesville, NC (US); Brett Simmons, Minneapolis, MN (US)

(73) Assignee: INRANGE TECHNOLOGIES, LLC, Raleigh, NC (US)

( * ) Notice: Subject to any disclaimer, the term of this patent is extended or adjusted under 35 U.S.C. 154(b) by 0 days.

(21) Appl. No.: 16/400,230

(22) Filed: May 1, 2019

(65) Prior Publication Data

US 2019/0337576 A1 Nov. 7, 2019

Related U.S. Application Data

(60) Provisional application No. 62/666,448, filed on May 3, 2018.

(51) Int. Cl.
*B62D 35/00* (2006.01)
*B62D 35/02* (2006.01)

(52) U.S. Cl.
CPC ......... *B62D 35/008* (2013.01); *B62D 35/001* (2013.01); *B62D 35/02* (2013.01); *B62D 35/007* (2013.01)

(58) Field of Classification Search
CPC .. B62D 35/001; B62D 35/002; B62D 35/008; B62D 35/02; B62D 37/02
USPC ................................ 296/180.1–180.2, 180.4
See application file for complete search history.

(56) References Cited

U.S. PATENT DOCUMENTS

| 4,611,847 A * | 9/1986 | Sullivan | B62D 35/001 296/180.2 |
| 6,932,419 B1 * | 8/2005 | McCullough | B62D 35/001 296/180.1 |
| 8,303,025 B2 | 11/2012 | Senatro | |
| 8,408,570 B2 * | 4/2013 | Heppel | B62D 35/001 280/154 |
| 8,727,425 B1 | 5/2014 | Senatro | |

(Continued)

OTHER PUBLICATIONS

Eagles, N. and Cragun, M., "A Parametric Assessment of Skirt Performance on a Single Bogie Commercial Vehicle," SAE International Journal of Commercial Vehicles, 2013, 6(2): 459-476.

*Primary Examiner* — Dennis H Pedder
(74) *Attorney, Agent, or Firm* — Michael Best & Friedrich LLP

(57) ABSTRACT

A vehicle trailer assembly includes a moveable bracket or frame member mounted to a trailer at a location outboard from one or more rear wheels of the trailer; and at least one undercarriage skirt wall at least partially affixed to the moveable bracket or frame member positioned along a bottom portion of a trailer. The at least one undercarriage skirt wall is selectively positioned laterally around the one or more rear wheels of the trailer, and the at least one undercarriage skirt wall is retractable in at least one direction to expose a portion of an underside of the trailer and/or the one or more rear wheels of the trailer. Another vehicle trailer assembly includes at least one undercarriage skirt wall positioned on a bottom side portion of the trailer. The at least one undercarriage skirt wall may be made of a pliable material.

14 Claims, 13 Drawing Sheets

(56) References Cited

U.S. PATENT DOCUMENTS

| | | | |
|---|---|---|---|
| 10,093,363 B2 | 10/2018 | Brereton et al. | |
| 10,829,168 B2 | 11/2020 | Senatro | |
| 2003/0057736 A1* | 3/2003 | Long | B62D 25/168 296/180.4 |
| 2018/0050742 A1* | 2/2018 | Smith | B62D 35/001 |
| 2020/0231226 A1 | 7/2020 | Senatro et al. | |

* cited by examiner

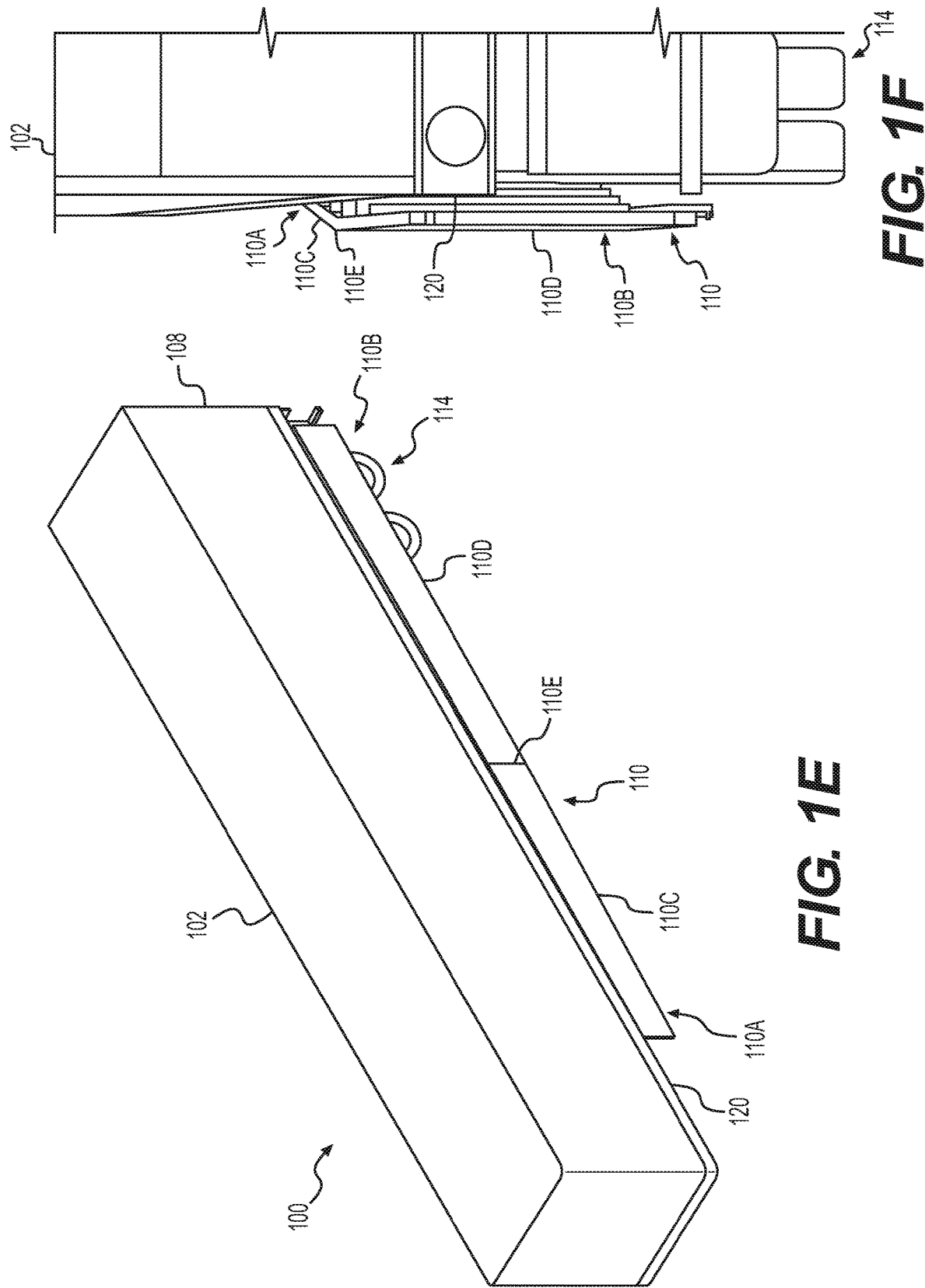

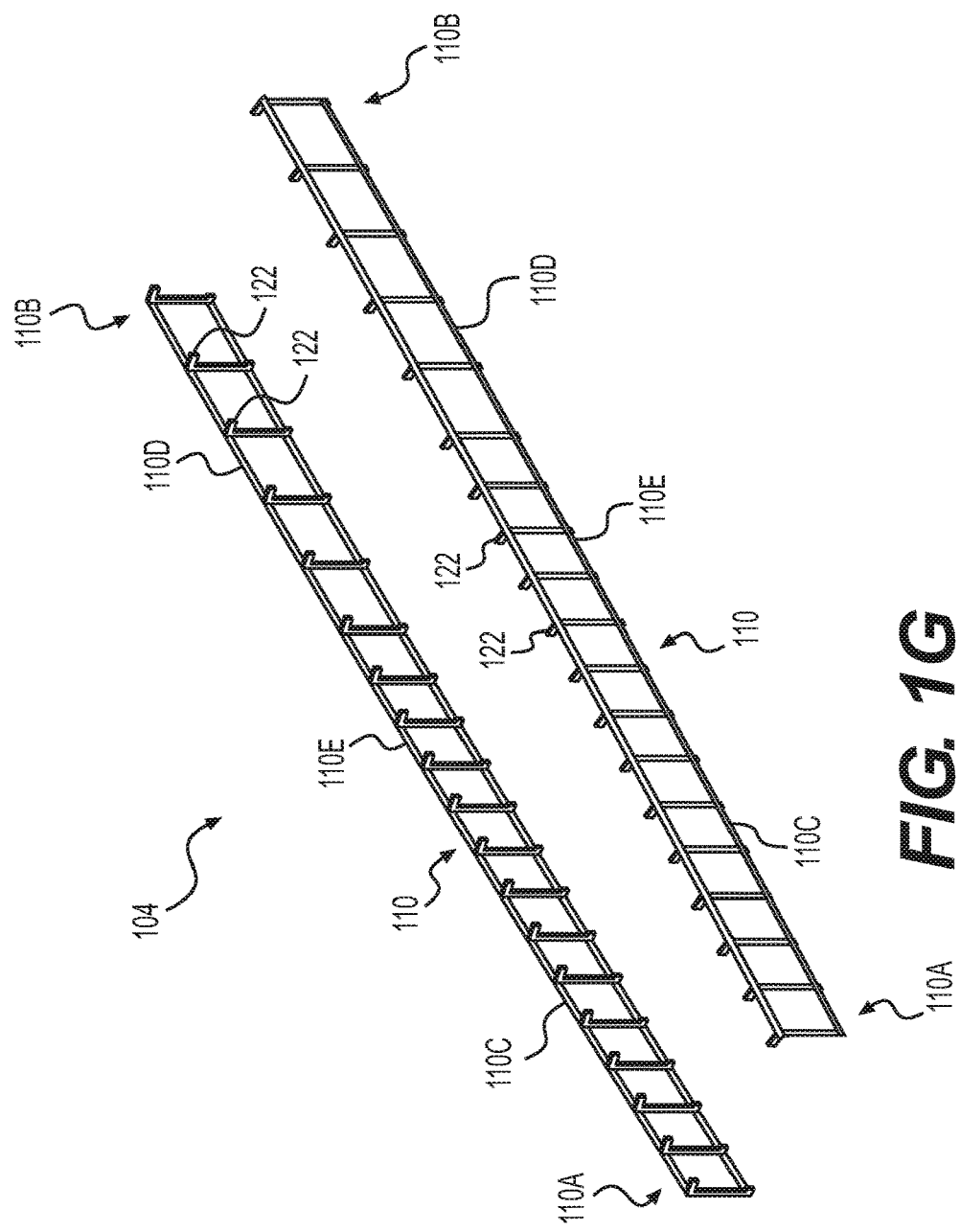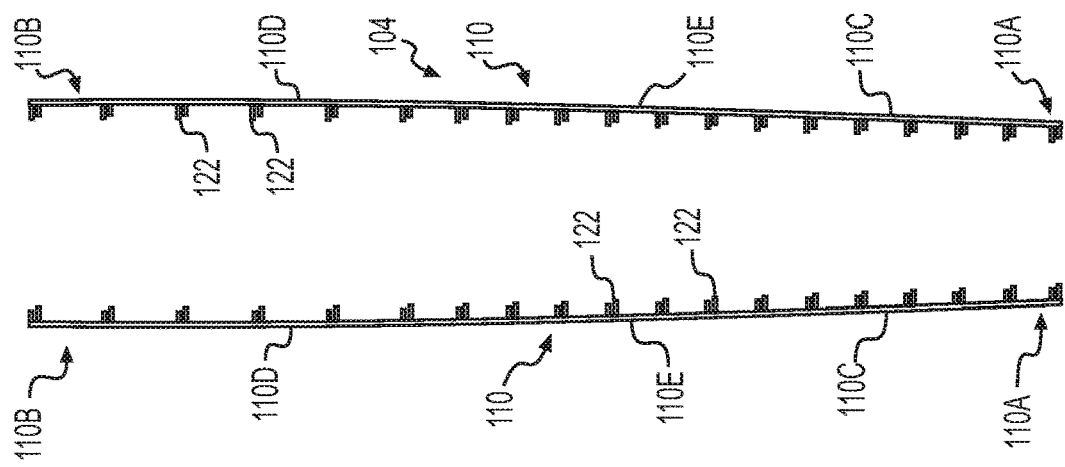

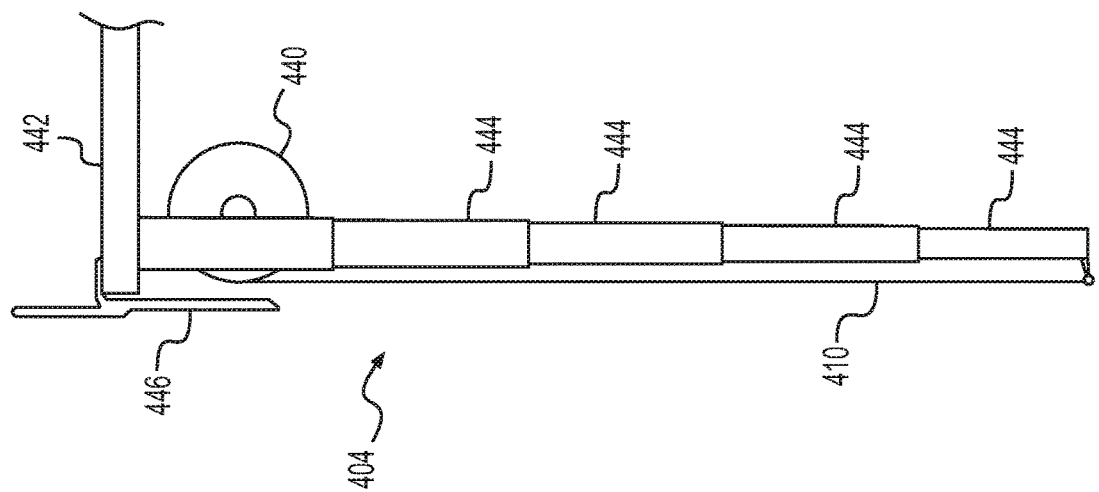
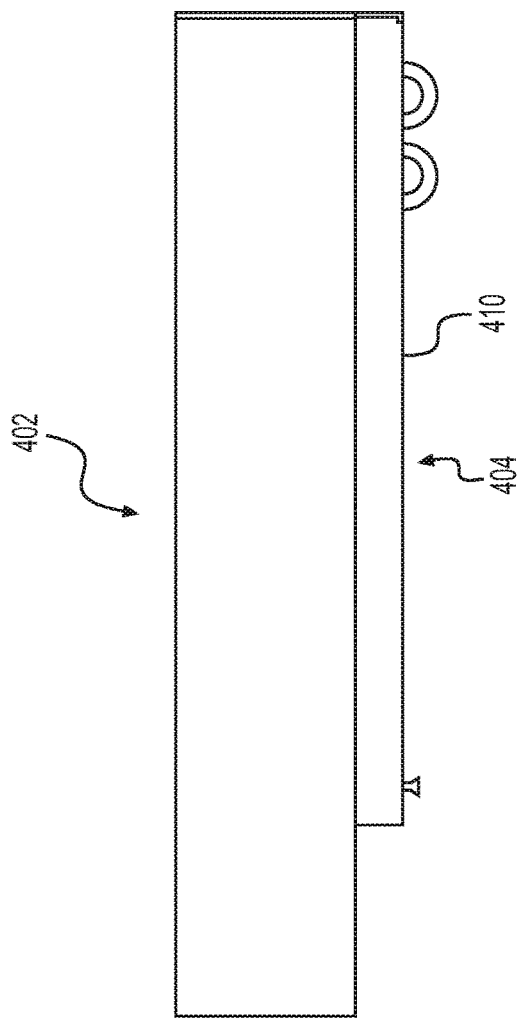
FIG. 4B
FIG. 4A

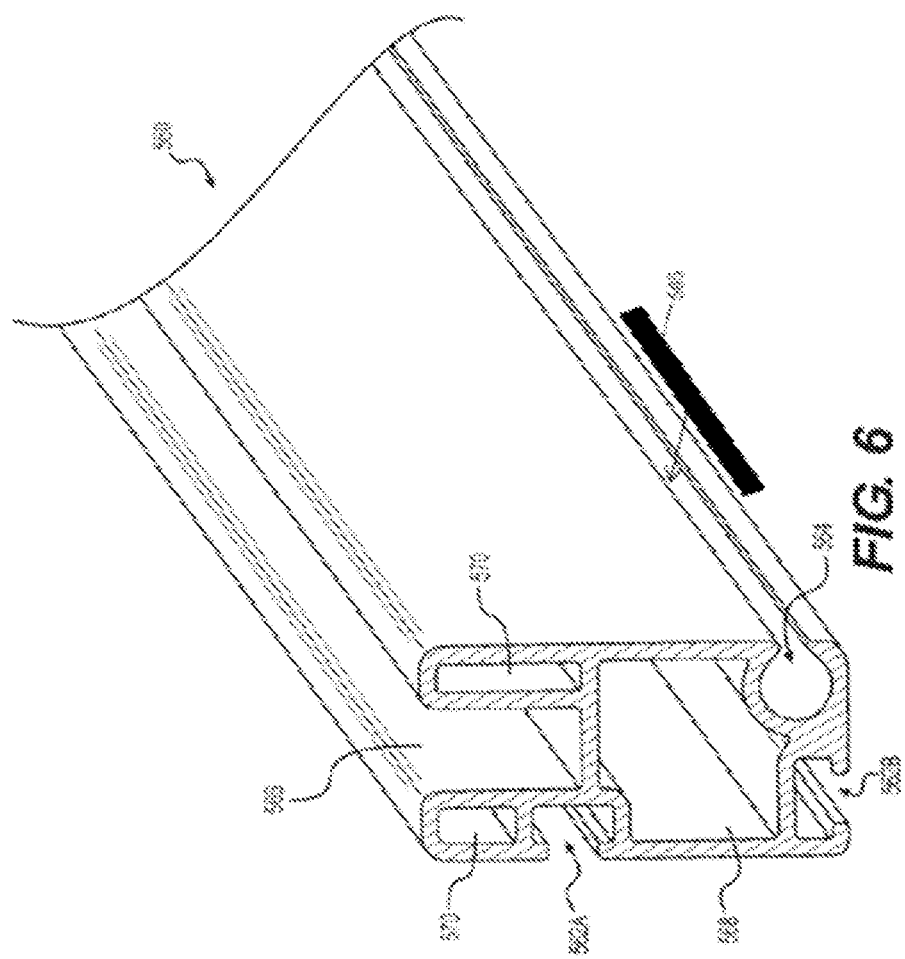

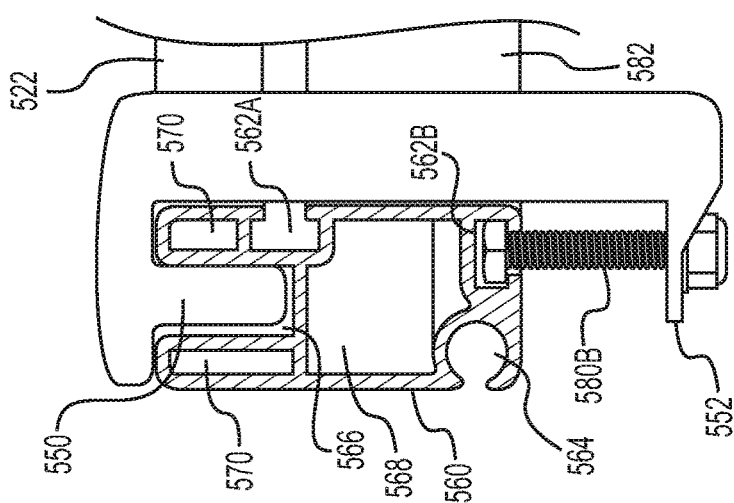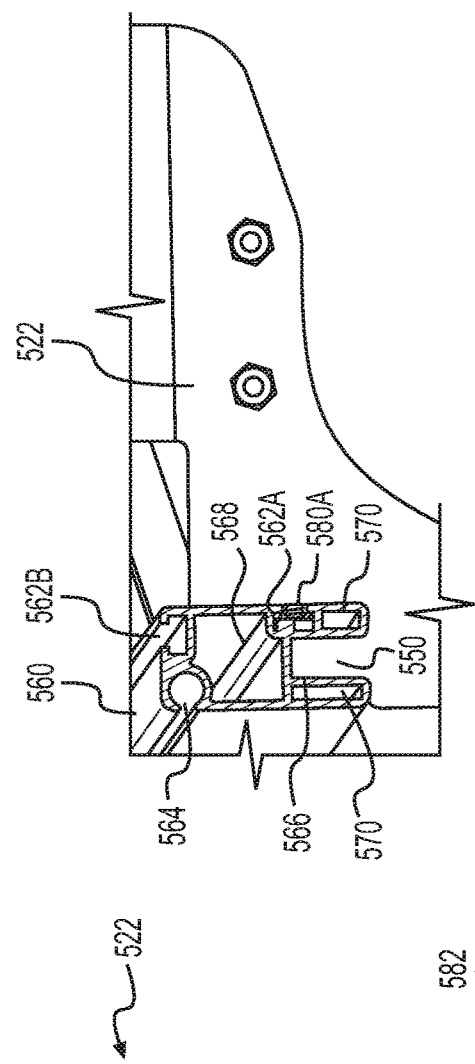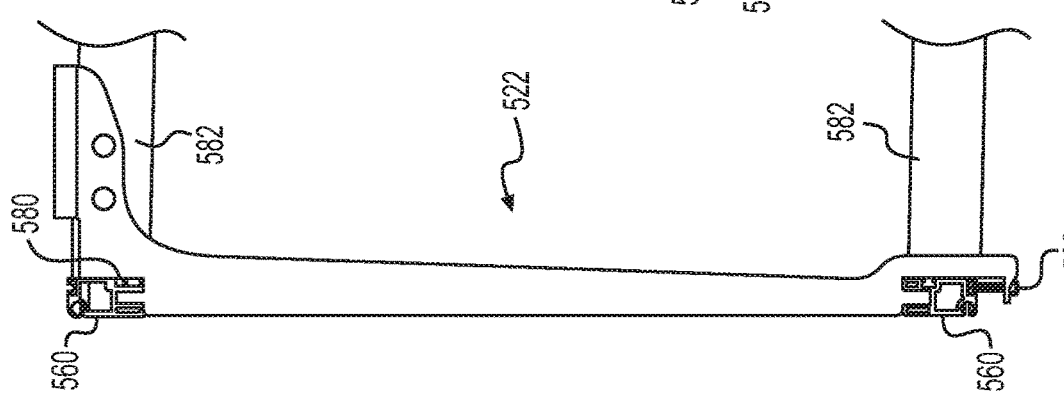

AERODYNAMIC DEVICES FOR MOVING VEHICLES

CROSS-REFERENCE TO RELATED APPLICATIONS

This patent application claims the benefit of priority under 35 U.S.C. § 119 to U.S. Provisional Patent Application No. 62/666,448 filed May 3, 2018, which is herein incorporated by reference in its entirety.

TECHNICAL FIELD

Various aspects of the present disclosure relate generally to devices, systems, and methods configured to improve fuel economy and/or aerodynamics in moving vehicles. More specifically, the present disclosure relates to devices, systems, and methods that utilize a pliable material or fabric positioned on a vehicle for improving fuel economy and/or aerodynamics of the vehicle.

BACKGROUND

Side skirts on trailers, trucks, and other vehicles or devices used with vehicles have been used for many years to reduce drag and/or suppress spray and splashing. These skirts extend downward from the trailer bottom edge towards the roadway.

Innovation in the design and manufacture of side skirts has been minimal. Most changes have focused on the bracket to hold the skirt wall and ensuring that the bracket can absorb shocks in the case of the skirt wall being impacted during transit. The primary cause of this need for shock absorption has been a method of installation of a rigid side skirt wall.

Existing skirt walls do not extend to the rear of the trailer, for example, past the rear tandem wheels. Several constraints make a longer skirt difficult to design. First, present designs focus on maximizing side skirt height (vertical distance). As a result, the skirt wall and support brackets have been made of a resilient material in order to protect against impacts from other vehicles, curbs, loading docks, etc. These designs are not well suited to extend around the wheels where any bend in the skirt would damage or obstruct the wheels. Second, the resilient side skirt systems include brackets that do not extend to the bottom of the skirt. This may be due to cost considerations (shorter brackets are cheaper) or primarily to ensure that, if the skirt is impacted, the bracket is not damaged. Longer brackets may help protect against the skirt wall engaging anything behind the skirt, such as wheels. However, longer brackets present design challenges in order for the bracket to fit around the rear tandem wheels. Third, the use of primarily rigid, but resilient, materials for the side skirt wall has many drawbacks. While durable, the rigid materials tend to be heavy, difficult to repair, and too cumbersome to move.

The use of rigid materials for the side skirt wall has many drawbacks. While durable, the rigid materials tend to be heavy and difficult to repair. Additionally, the rigidity forces the system or systems coupling the rigid side skirt wall to the vehicle to become permanent installations. In particular, it is cumbersome to remove the side skirt wall from a mounting system where the mounting system is designed to ensure that the rigid material making up the side skirt panel is well secured. As a result, many skirt systems block access to the bottom of the vehicle or trailer. Although hinged or articulated arm systems have been developed to couple the side skirt to a vehicle or trailer, existing side skirts have a limited length in order to ensure that the side skirts do not block access to important components of the vehicle or trailer, such as, for example, the rear tandem wheels and/or landing gear. Including one or more hinges to movably couple the side skirt to the vehicle or trailer often yields a cumbersome system that blocks access to the wheels and may be difficult to operate. A majority of semi-trailer activities require a pre-trip Department of Transportation mandated "walk-around" or visual inspection of the wheels, so a side skirt that blocks or inhibits the view or access to the wheels would be detrimental. Moreover, existing side skirt systems often block or inhibit access to spare tires and other elements positioned on the underside of the trailer, especially when rear tandems wheels are moved fully forward for carrying certain loads.

Eagles, N. and Cragun, M., "A Parametric Assessment of Skirt Performance on a Single Bogie Commercial Vehicle," SAE Int. J. Commer. Veh. 6(2):2013, doi:10.4271/2013-01-2415, have also shown that nearly any design of a skirt under the trailer will help to reduce wind drag, and accordingly reduce the amount of fuel, and, correspondingly, the cost necessary to pull the trailer. Over 2,000 different designs of trailer skirts were tested, but none of the designs include a trailer skirt that extends outside of the area between the truck landing gear and the rear tandem wheels of the trailer. Longer versions of trailer skirts have been used on Department of Energy "Super Trucks" and have confirmed that there may be benefits to a longer trailer skirt, but any such trailer skirts have been made of a rigid material.

As mentioned, the use of rigid material to form the skirt wall means that the skirt installation is substantially permanent, such that many owners or operators consider the skirts to be part of the trailer for its foreseeable life. The substantially permanent trailer side skirt may significantly reduce the payback period of the truck-trailer system by the factor of the ratio of tractors to trailers for the particular freight company. For example, according to the North American Council for Freight Efficiency, the average freight transportation fleet has three trailers for every tractor. Since aerodynamic drag on a trailer can only be reduced when the trailer is being pulled by a tractor, the trailers currently not in use derive no benefit from an aerodynamic side skirt device. Many calculated payback periods typically ignore this fact of the freight industry's operations.

The devices and methods of the current disclosure may rectify some of the deficiencies described above or address other aspects of the prior art.

SUMMARY

Examples of the present disclosure relate to, among other things, pliable aerodynamic devices for moving vehicles. Each of the examples disclosed herein may include one or more of the features described in connection with any of the other disclosed examples.

Aspects of this disclosure may improve upon past efforts to achieve efficiency through trailer design by focusing primarily on one or more structures beneath a trailer's floor in order to reduce air drag. Additional aspects of this disclosure may improve upon past efforts to achieve efficiency through trailer design by focusing primarily on one or more structures on the rear face or rear sides of a trailer in order reduce air drag.

Additionally, various aspects of this disclosure may include a vehicle trailer assembly that may include a bracket or frame member mounted to a trailer at a location outboard from one or more rear wheels of the trailer, and at least one undercarriage skirt wall at least partially affixed to the bracket or frame member positioned along a bottom portion of a trailer. The at least one undercarriage skirt wall may be selectively positioned laterally around the one or more rear wheels of the trailer, and the at least one undercarriage skirt wall may be retractable in at least one direction to expose a portion of an underside of the trailer and/or the one or more rear wheels of the trailer.

The vehicle trailer assembly may include one or more of the following features. The at least one undercarriage skirt wall may be coupled to the trailer via at least one bracket and at least one frame member. The at least one undercarriage skirt wall may be coupled to the trailer via a plurality of brackets positioned along a side or bottom of the trailer and two frame members respectively connected to either a top or a bottom portion of each bracket. The brackets may include one or more extensions to couple the brackets to a girder on the bottom of the trailer. The brackets may include one or more tabs in the top and bottom portions, and the two frame members may include channels configured to receive at least one of the one or more tabs. The brackets may include one or more openings configured to receive a coupling member, and the frame members may each include one or more grooves configured to lockably receive the coupling member. The two frame members may include a slot extending longitudinally along a side of the frame members, and the slot may be configured to receive a cylinder coupled to fabric or pliable material. Tightening the coupling member that couples the frame member to the bottom portion of the bracket may be configured to tension the fabric or pliable material. The two frame members may include the same configuration of grooves and slots, and the two frame members may include one or more central or internal openings that extend longitudinally within the frame members.

In another aspect, a vehicle trailer assembly may include a bracket or frame member mounted to a trailer at a location outboard from one or more rear wheels of the trailer, and at least one undercarriage skirt wall positioned on a bottom side portion of the trailer. The at least one undercarriage skirt wall may be made of a pliable material.

The vehicle trailer assembly may include one or more of the following features. The at least one undercarriage skirt wall may become taut and smooth when engaged to a predetermined tension. The vehicle trailer assembly may further include both a frame and a mechanical device coupled to the undercarriage skirt wall to achieve the predetermined tension. The at least one undercarriage skirt may extend around at least a portion of the bottom perimeter of the trailer including at least one rear wheel. The vehicle trailer assembly may further include a mechanical system configured to extend and retract the at least one undercarriage skirt wall vertically or horizontally relative to the trailer. The vehicle trailer assembly may further include a supporting structure configured to couple the at least one undercarriage skirt wall to the trailer. The vehicle trailer assembly may further include one or more fairings coupled to a rear face of the trailer, and the one or more fairings may be configured to be mechanically deployed or retracted with manual or electric power.

In yet another aspect, a side skirt system for a vehicle or trailer may include a side skirt formed of a pliable material, a plurality of brackets configured to be coupled to a trailer, and at least two frame members having identical arrangements of two notched grooves, each notched groove configured to selectively receive a coupling element, and a slot configured to receive a portion of the side skirt.

The side skirt system may include one or more of the following features. Each of the plurality of brackets may include a top portion and a bottom portion, and each of the top portion and the bottom portion may include at least one tab that extends away from the bracket. Each of the at least two frame members may include a channel configured to receive at least a portion of one tab that extends away from portions of the brackets. The side skirt may be coupled to a cylindrical element, and the cylindrical element may be configured to be positioned within the slot of the frame members. The side skirt may include at least two portions of material such that at least one opening may be formed in the side skirt.

Both the foregoing general description and the following detailed description are exemplary and explanatory only and are not restrictive of the features, as claimed. As used herein, the terms "comprises," "comprising," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal."

BRIEF DESCRIPTION OF THE DRAWINGS

The accompanying drawings, which are incorporated in and constitute a part of this specification, illustrate exemplary features of the present disclosure and together with the description, serve to explain the principles of the disclosure.

FIGS. 1A-1F illustrate various views of an exemplary side skirt coupled to a trailer, and FIGS. 1G and 1H illustrate perspective and top views, respectively, of the exemplary side skirt system, according to aspects of the present disclosure.

FIGS. 4A and 4B illustrate a side view and a cross-sectional view of yet another exemplary side skirt coupled to a trailer, according to aspects of the present disclosure.

FIG. 6 illustrates a perspective view of an exemplary frame member that may be used to couple the side skirt to one or more brackets, according to aspects of the present disclosure.

FIGS. 7C-7E illustrate various aspects of the coupling between the skirt support structure to one or more frame members and the side skirt, according to aspects of the present disclosure.

DETAILED DESCRIPTION

Examples of the present disclosure relate to devices and systems configured to improve vehicular energy efficiency.

The devices and systems may be used to improve aerodynamics by reducing drag, and thus improving fuel efficiency.

Reference will now be made in detail to examples of the present disclosure described above and illustrated in the accompanying drawings. Wherever possible, the same reference numbers will be used throughout the drawings to refer to the same or like parts.

Figure 1A:
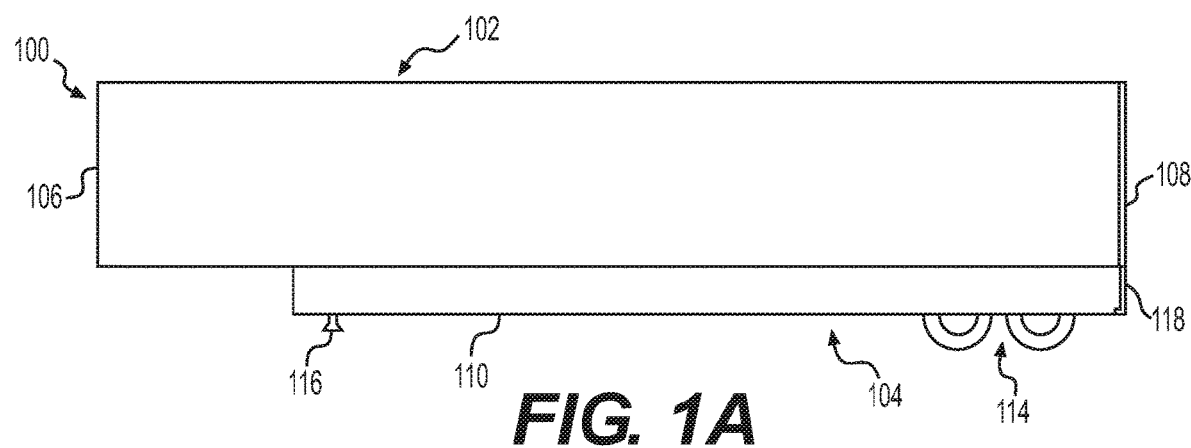

FIG. 1A-1H illustrate various aspects of a trailer system 100. As shown in FIG. 1A, trailer system 100 includes a trailer 102 and a skirt system 104. Trailer 102 includes a front 106 and a rear 108. Skirt system 104 includes one or more undercarriage skirt walls or side skirts 110 coupled to a bottom of trailer 102. The undercarriage side skirt 110 may extend below trailer 102 from a position even with rear 108 of trailer 102 toward front 106 of trailer 102. Additionally, the undercarriage side skirt 110 may be made of pliable material. As shown, the undercarriage skirt 110 may span rear tandem wheels 114 and a landing gear 116 of trailer 102. It is noted that FIGS. 1A-1H illustrate a trailer that may be coupled to a tractor, but skirt system 104 may be coupled to any moving vehicle without departing from this disclosure.

Figure 1B:
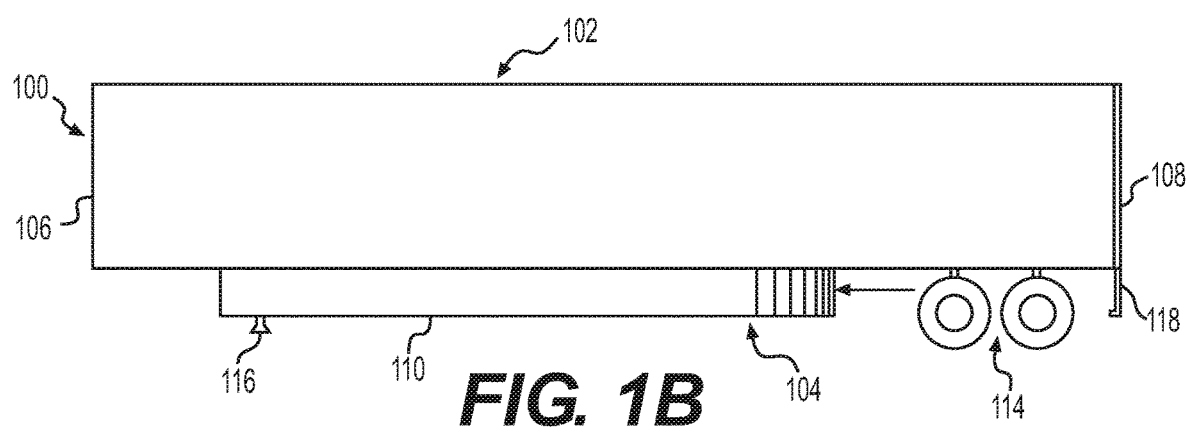

As shown in FIGS. 1A and 1B, rear 108 of trailer 102 may include a notched cylinder or other holder 118, extending downward from rear 108 of trailer 102. Holder 118 may be used to clasp, secure, tension, or otherwise couple undercarriage side skirt 110 in the extended position shown in FIG. 1A. Side skirt 110 may be formed of a fabric or material, and may include one or more hooks, cylinders, rods, rollers, clips, buttons, or other attachment elements to connect the side skirt 110 to a mounting frame or directly to trailer 102. Additionally, the portion of undercarriage side skirt 110 that extends toward holder 118 (as in FIG. 1B), may include a clip, hook, track, or other element to secure and tension undercarriage side skirt 110 in the extended position. Therefore, as shown in FIG. 1B, a portion of the undercarriage side skirt 110 may be uncoupled from holder 118, and the undercarriage side skirt may retract, recede, coil, slide, or otherwise move along trailer 102. When coupled to trailer 102, side skirt 110 may extend from a position forward of landing gear 116 to a position to the rear of rear tandem wheels 114. Side skirt 110 may include a consistent height (vertically in FIGS. 1A and 1B), or may include a varying height along a length of side skirt 110.

As mentioned, the one or more side skirts 110 may be formed of a pliable material. For example, the one or more side skirts 110 may be formed of a fabric material, such as, vinyl fabric. In one aspect, the one or more side skirts 110 may be formed of a 28 ounce vinyl fabric coated with a clear acrylic. The one or more side skirts 110 may be formed of a single solid piece of material or two or more pieces of material. Forming the one or more side skirts 110 out of two or more pieces of material may allow for respective pieces to be opened or retracted individually, for example, from a front, middle, or back portion of the side skirt 110. Additionally, although not shown, side skirts 110 may include windows, flaps, or other openings. For example, one or more flaps may be secured with zippers, ties, buttons, Velcro™, or another coupling element in order to provide access or visual inspection to an element or portion of trailer 102 that is within side skirt 110, for example, a diesel reefer fuel tank coupled to the bottom of trailer 102.

Figures 1C, 1D:
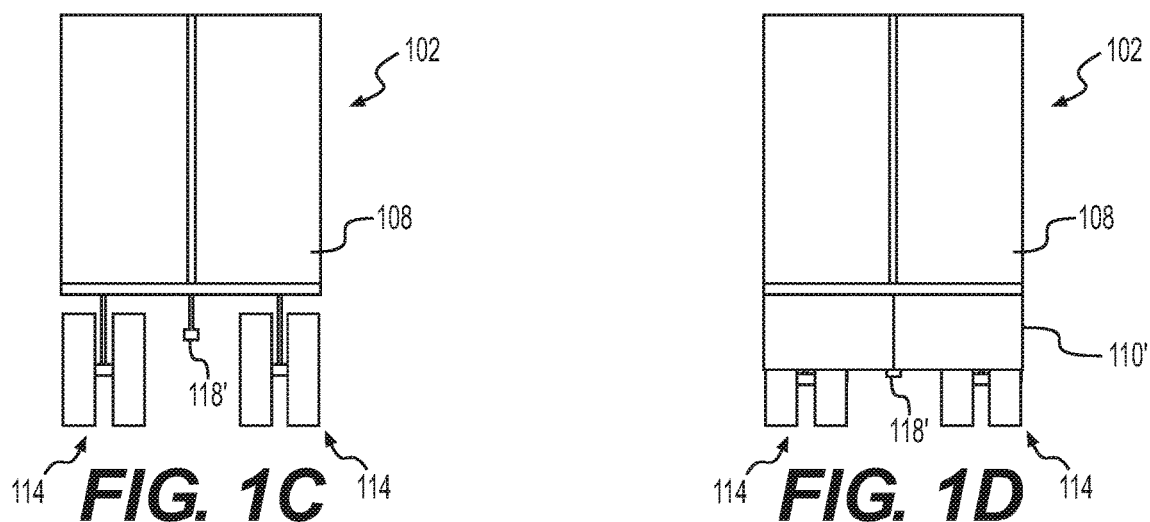

As shown in FIGS. 1C and 1D, the rear portion 108 of trailer 102 may also include an undercarriage side skirt 110', which may be extendable and retractable as described with respect to FIGS. 1A and 1B around one or more rear corners of trailer 102. For example, a holder 118' may be positioned in a central portion of rear 108 of trailer 102, and undercarriage side skirt 110' may be coupled to holder 118' and secured and/or tensioned, as discussed herein.

FIG. 1E illustrates a perspective view of an exemplary arrangement of a side skirt wall 110 coupled to trailer 102, and FIG. 1F illustrates a rear view of the exemplary arrangement of side skirt 110 coupled to trailer 102. As shown, side skirt 110 may be coupled to trailer 102 at an angle. For example, a front end 110A of side skirt 110 may be positioned interior to a bottom outer edge 120 of trailer 102. A rear end 110B of side skirt 110 may be positioned along outer edge 120 of trailer 102. Alternatively, as shown in FIG. 1F, rear end 110B of side skirt 110 may extend outward from outer edge 120 of trailer 102. For example, rear end 110B of side skirt 110 may extend approximately three inches outside of outer edge 120 of trailer 102, which may help to ensure that side skirt 110 does not contact or otherwise interfere with rear wheels 114.

Side skirt 110 may include a continuous angle from front end 110A to rear end 110B. Alternatively, as shown in FIGS. 1E and 1F, side skirt 110 may include an angled portion 110C and a straight portion 110D that are joined at a junction 110E. In either aspect, the angle of side skirt 110 may help direct air and/or decrease air resistance on or around trailer 102.

FIGS. 1G and 1H illustrate perspective and top views of the exemplary skirt system 104 uncoupled from a trailer. As shown, side skirt 110 may include an angle. For example, front end 110A of side skirt 110 may be at an angle. Rear end 110B of side skirt 110 may be configured to be positioned along outer edge 120 of trailer 102. Alternatively, as shown in FIG. 1F, rear end 110B of side skirt 110 may extend outward from outer edge 120 of trailer 102.

In addition to side skirt(s) 110, skirt system 104 may include a plurality of brackets 122 in order to mount or otherwise couple side skirt(s) 110 to trailer 102. As discussed in detail below, brackets 122 may be coupled to trailer 102, for example, to one or more trailer girders. Brackets 122 may be used to help clasp, secure, tension, or otherwise couple side skirt 110 and/or a frame to trailer 102.

It is noted that, for clarity, side skirts 110 are shown as transparent in FIG. 1G. Furthermore, it is noted that brackets 122 may be evenly spaced along side skirt 110 to coupled side skirt 110 to trailer 102. Alternatively, as shown in FIGS. 1G and 1H, brackets 122 may be more densely positioned along front end 110A of skirt system 104 than along rear end 110B of skirt system 104 or more densely positioned along rear end 110B than along front end 110A. Additionally, the spacing of brackets 122 may vary depending on a spacing of cross-members along a bottom portion of a trailer. In one aspect, the spacing of brackets 122 may be approximately 20 to 24 inches in one portion, and may be approximately 32-36 inches in another portion.

Figure 2A:
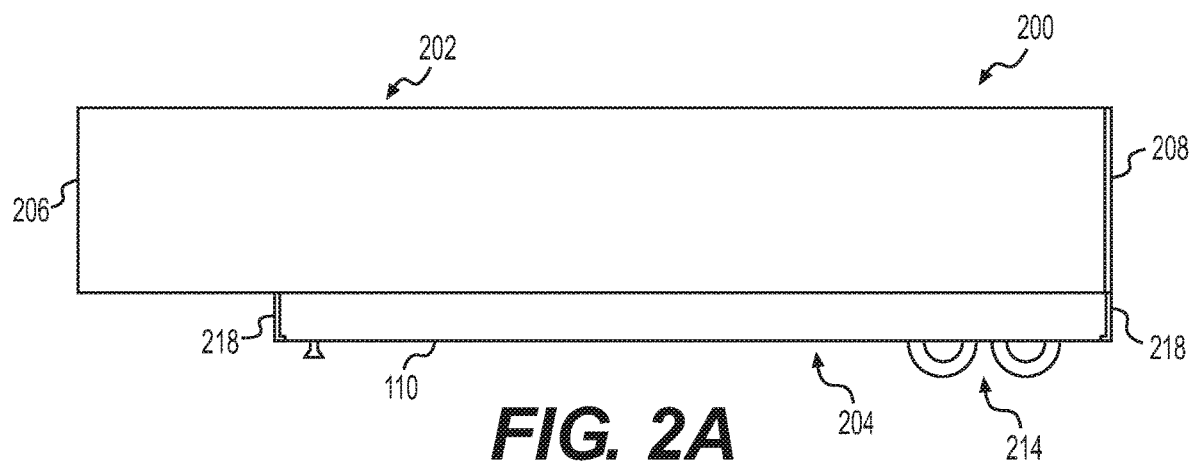
FIGS. 2A-2D illustrate various views of another exemplary side skirt coupled to a trailer, according to aspects of the present disclosure.
Figure 2B:
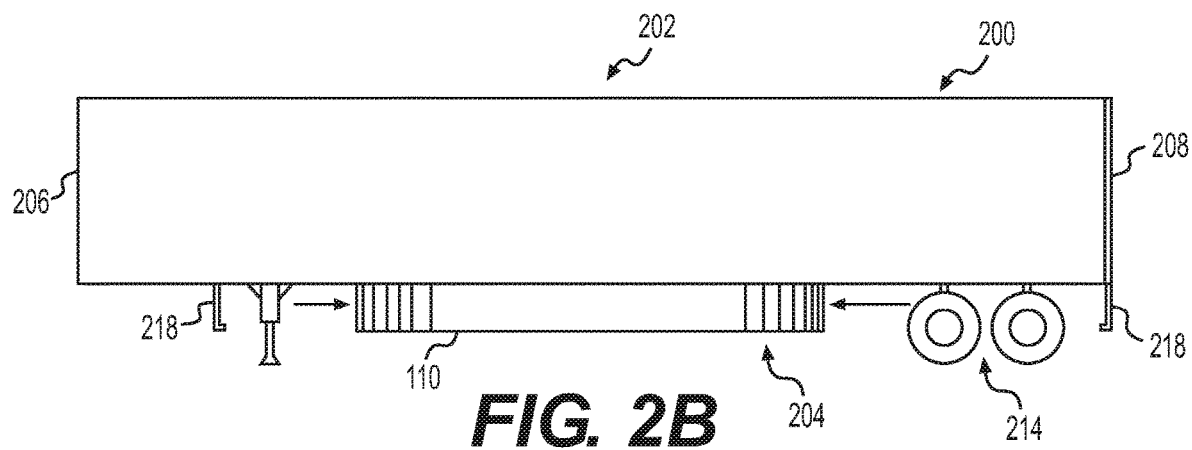
Figure 2C:
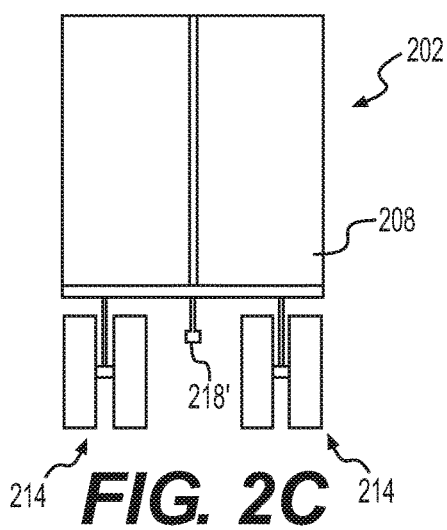
Figure 2D:
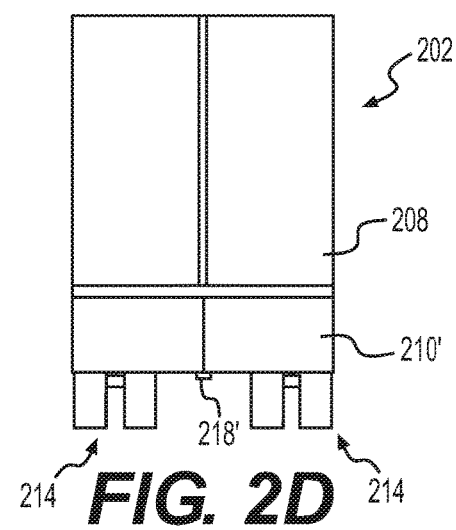

FIGS. 2A-2D illustrate additional aspects of this disclosure. FIGS. 2A-2D illustrate an alternative example with similar elements to trailer system 100 shown by 100 added to the reference numbers. For example, the undercarriage side skirt 210, or skirt wall, shown in FIG. 2A may have a holder 218 at the rear or front of trailer 202. Holder 218 may be directly coupled to trailer 202, for example, to a trailer girder (not shown). As shown in FIG. 2B, with the undercarriage skirt wall 210 uncoupled from the holders 218, the undercarriage side skirt 210, or skirt wall, may then move from front to rear or rear to front along the bottom of trailer 202. As shown in FIGS. 2C and 2D, the undercarriage skirt wall 210 may be positionable to span at least a portion of the rear 208 of the trailer 202 as well, as discussed above with respect FIGS. 1C and 1D.

Figure 3B:
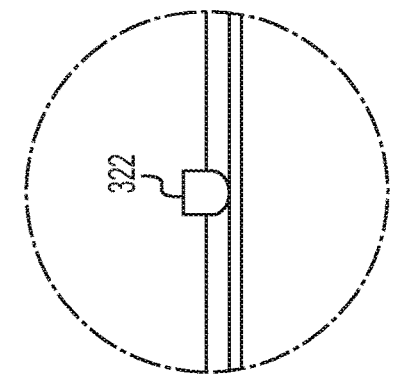
FIGS. 3A-3G illustrate various views of a further exemplary side skirt coupled to a trailer, according to aspects of the present disclosure.
Figure 3D:
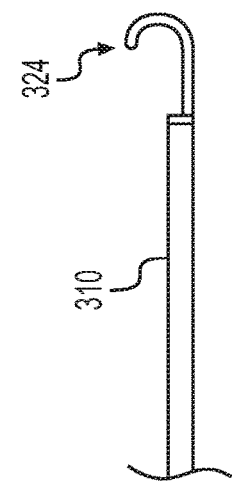
Figure 3A:
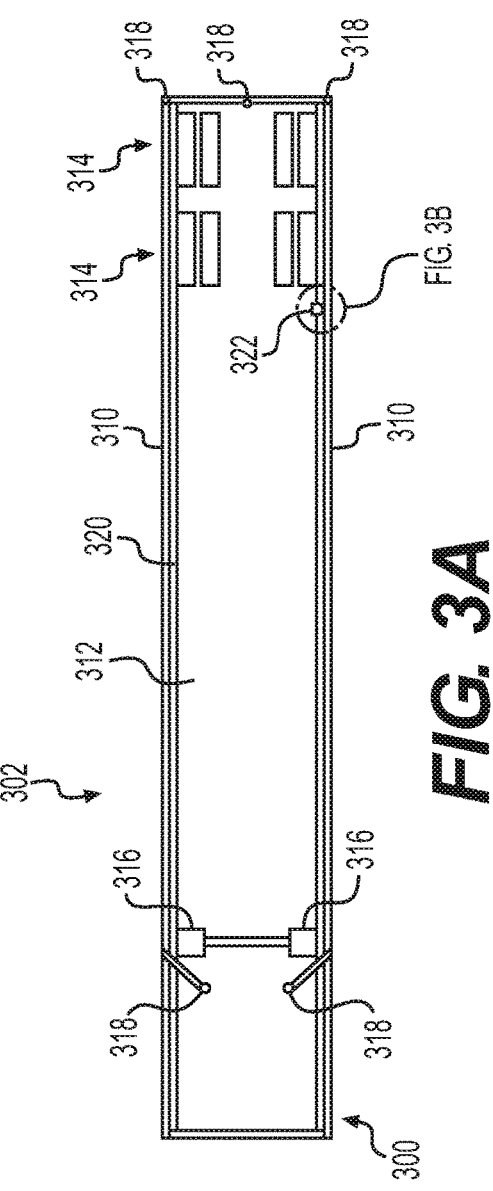

FIGS. 3A-3G illustrate further aspects of this disclosure. FIGS. 3A-3D illustrate an alternative example with similar elements to trailer system 100 shown by 200 added to the reference numbers. FIG. 3A illustrates a bottom view of the trailer 302, with the undercarriage side skirt 310, or skirt wall, positioned along the trailer perimeter, or outer edges 320. It is noted that portions of the undercarriage assembly, for example, holders 318, are coupled on left and right sides of the bottom 312 of the trailer 302 at positions around the perimeter of trailer 302 and/or within a perimeter of trailer 302. For example, holders 318 may be positioned along bottom 312 in order to securely position side skirt 310 to trailer 302, while also ensuring that side skirt 310 does not interfere with wheels 314 or landing gear 316.

FIG. 3B illustrates a bottom view of a skirt post, bracket 322, or similar structure and the undercarriage skirt wall. As shown in FIG. 3A, skirt posts or brackets 322 may be positioned around the perimeter of the trailer to support, tension, secure, or guide the undercarriage skirt wall or walls, as shown in FIGS. 1D, 2D, and 3A. For clarity, however, only one bracket 322 is shown on FIG. 3A.

Figure 3C:
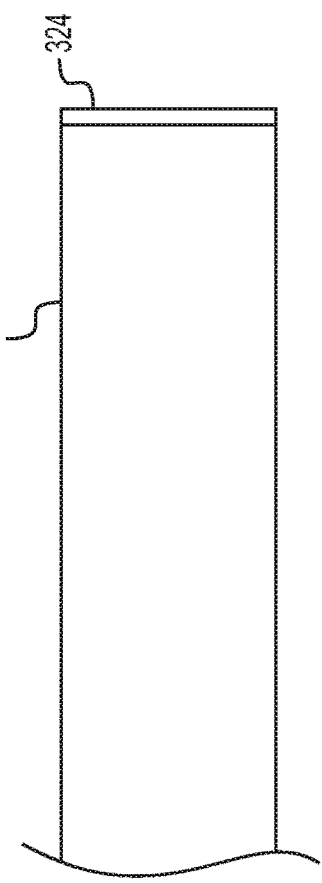

FIG. 3C illustrates a side view of a portion of an exemplary undercarriage side skirt 310, and FIG. 3D illustrates a bottom view of the undercarriage side skirt 310. As shown, an end or an edge of the undercarriage skirt wall 310 may include a hook or hooks 324. For example, referring to FIG. 3E, hook(s) 324 may be coupled to the notched cylinder or holder 318. In one aspect, although not shown, the notched cylinder or holder 318 may include a plurality of notches positioned along a length of holder 318 to receive the hook(s) 324, and thus temporarily secure and/or tension the undercarriage skirt wall 310 in the extended position.

Figure 3G:
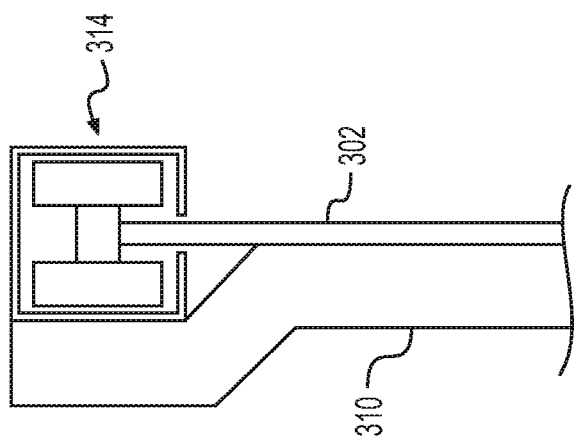
Figure 3F:
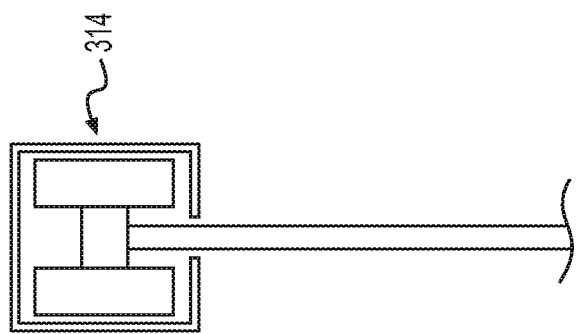
Figure 3E:
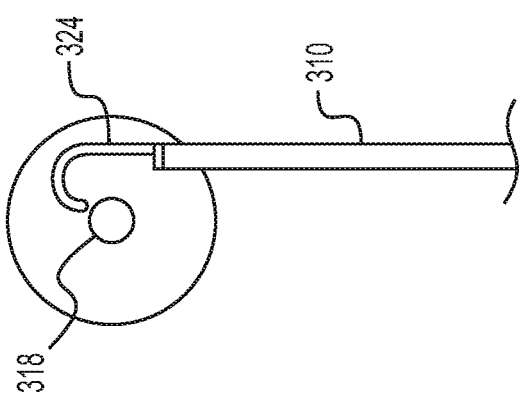

FIGS. 3F and 3G illustrate side views of an exemplary method to couple side skirt 310 to trailer 302. For example, as shown in FIG. 3F, undercarriage side skirt 310 may be coupled to trailer 302 by attaching to a wheeled assembly that then slides along a C-channel. Additionally, as shown in FIG. 3G and as discussed in detail below, an undercarriage skirt post may extend from the C-channel at an angle in order to run perpendicular and tangent to the skirt length and guide, secure, tension, or otherwise hold the skirt.

FIGS. 4A and 4B illustrate additional exemplary aspects of this disclosure. FIGS. 4A and 4B illustrate an alternative example with similar elements to trailer system 100 shown by 300 added to the reference numbers. Specifically, FIGS. 4A and 4B illustrate an undercarriage side skirt system 404 coupled to trailer 402. As shown in FIG. 4B, side skirt system 404 may include a spool roll 440 for the undercarriage side skirt 410. A bottom rail 442 would attach to side skirt 410 and to one or more telescoping arms 444. As such, the undercarriage side skirt system 404 may be unspooled from spool roll 440 to extend and be secured and tensioned along the trailer perimeter, as shown in FIG. 4A. Spool roll 440 may include a spring or other biasing member such that side skirt 410 may be respooled, as the telescoping arms 444 contract. Additionally, a side rail 446 may be coupled to bottom rail 442, which may help protect spool roll 440. Furthermore, side skirt system 404 may be pretensioned or may be tensioned by any technique or system discussed herein.

Figure 5C:
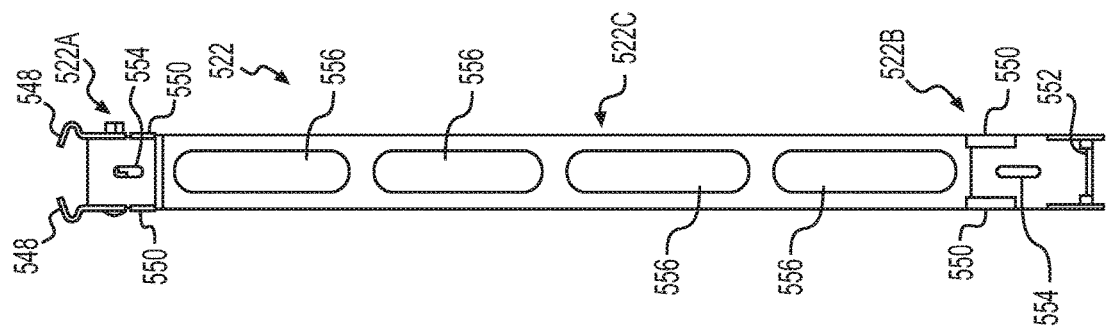
FIGS. 5A-5C illustrate perspective, side, and front views of an exemplary bracket that may be used to mount or otherwise couple a side skirt to a trailer, according to aspects of the present disclosure.
Figure 5B:
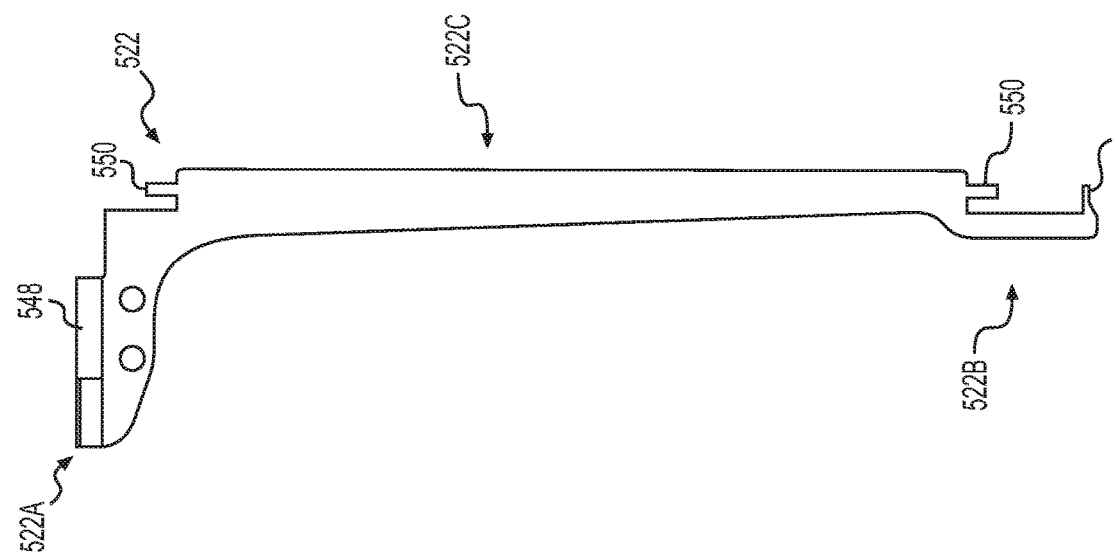
Figure 5A:
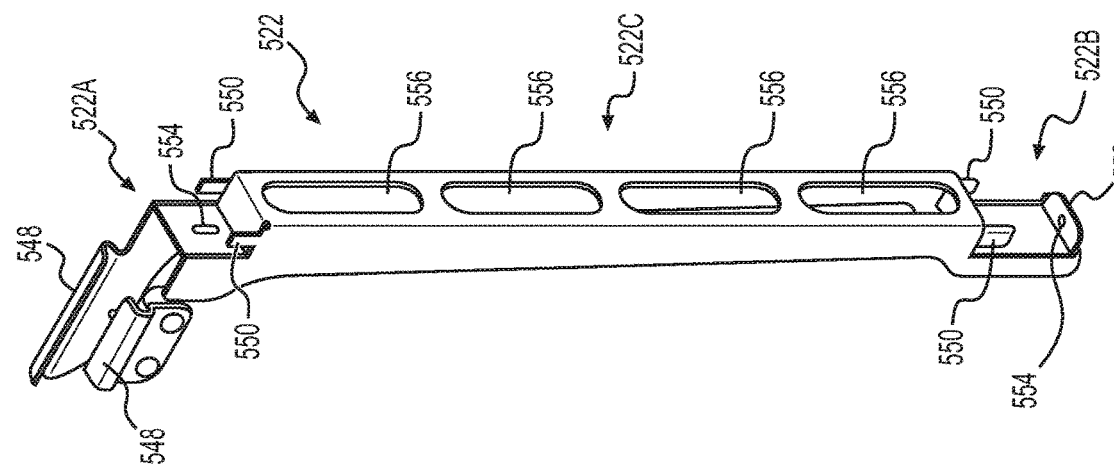

FIGS. 5A-5C illustrate various views of an exemplary mounting bracket 522. FIGS. 5A-5C illustrate an alternative example with similar elements to trailer system 100 shown by 400 added to the reference numbers. FIG. 5A is a perspective view of mounting bracket 522. FIG. 5B is a side view of mounting bracket 522, and FIG. 5C is a front view of mounting bracket 522. Mounting bracket 522 may include a low-profile shape, which may be mounted above the wheels in the rear of a trailer. Rear tandem wheels (e.g., wheels 114 in FIG. 1A) may be movable forward or backward depending on the load carried by a trailer, but mounting brackets 522 may be positioned and shaped so as to not obstruct the wheels.

A top portion 522A of mounting bracket 522 may clamp onto or otherwise be coupled to a portion of the trailer, for example, by coupling to a beam flange or girder, for example, via one or more grooved extensions 548. Mounting bracket 522 includes a plurality of tabs 550 at the top portion 522A and at a bottom portion 522B. Mounting bracket 522 may also include one or more ledges 552. One or more of tabs 550 and/or ledges 552 may help couple the side skirt to brackets 522. Moreover, mounting bracket 522 may also include one or more openings 554, for example, one opening 554 in top portion 552A and one opening 554 in bottom portion 552B. The one or more openings 554 may help couple one or more frame members 560 and/or the side skirt to one or more brackets 522.

Figure 7B:
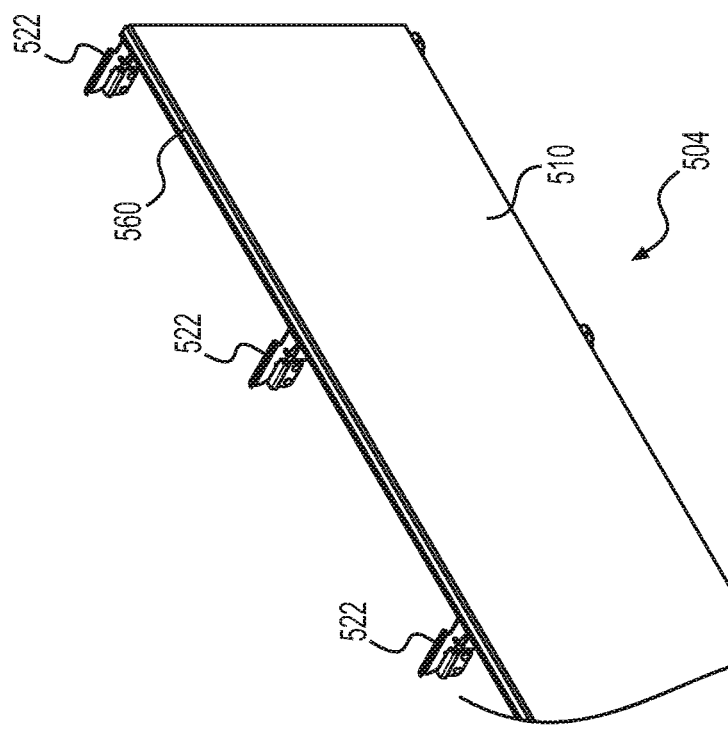
FIGS. 7A and 7B illustrate perspective views of an exemplary skirt support structure and of the exemplary skirt support structure with an exemplary side skirt coupled to the support structure, respectively.
Figure 7A:
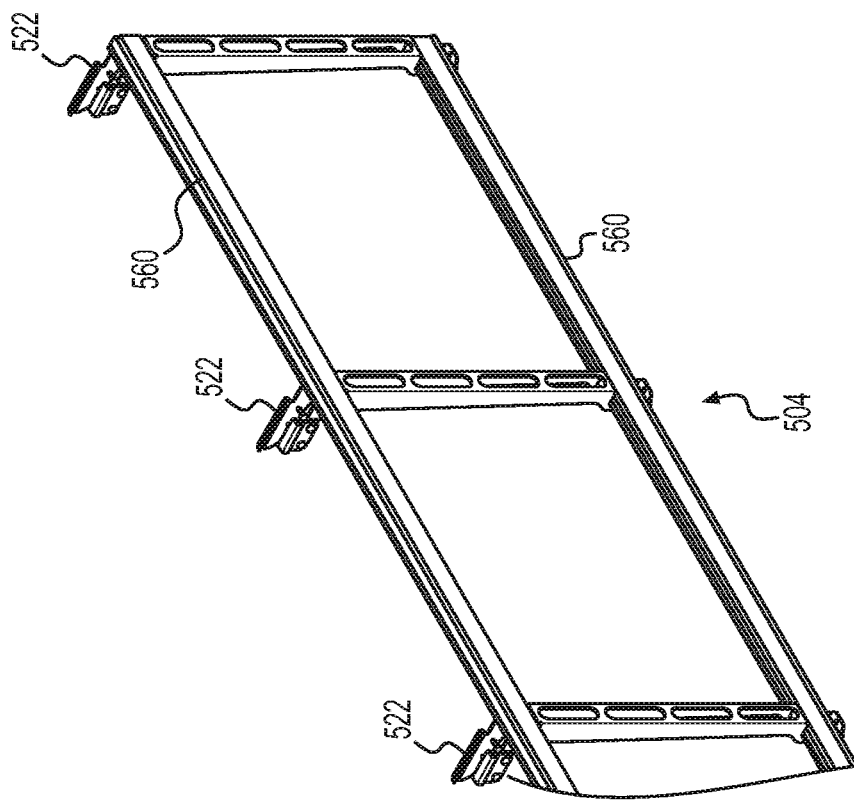

In one aspect, tabs 550 protrude from top portion 522A and bottom portion 522B in a direction away from a central portion 552C of bracket 522, and tabs 548 may help hold one or more frame members 560 (FIGS. 6 and 7A-7E). For example, as shown in FIGS. 7A and 7B, a first frame member 560 may be coupled to top portions 522A of a plurality of mounting brackets 522, and a second frame member 560 may be coupled to bottom portions 522B of the plurality of mounting brackets 522. As shown in FIGS. 7D and 7E, frame members 560 may be removably secured to mounting brackets 522 via one or more screws, bolts, nuts, or other coupling elements 562. For example, top and bottom portions of the side skirt may be respectively coupled to first and second frame members 560 via top and bottom portions of side skirt 510 being coupled to brackets 522, and frame members 560 may be coupled to brackets 522 in order to tighten or tension side skirt 510.

As shown in FIGS. 5A and 5C, mounting bracket 522 may include a plurality of holes 556, for example, in central portion 522C. Holes 556 may help to reduce to overall weight and material of mounting brackets 522. Mounting brackets 522 may be formed of a light yet rigid material. For example, mounting brackets 522 may be formed of 12 gauge steel.

As shown in FIG. 6, frame member 560 may include a first notched groove 562A, for example, on a side of frame member 560, and a second notched groove 562B, for example, on a bottom of frame member 560. Notched grooves 562A, 562B may be configured to lockably receive a coupling member 580 to couple frame member 560 to bracket 522, as shown in FIGS. 7A-7E. For example, notched grooves 562A, 562B may be substantially "T-shaped" cut outs that extend the length of frame member 560 or extend one or more portions of frame member 560, and may be configured to receive a bolt head or another coupling element or portion of a coupling element. In this aspect, notched grooves 562A, 562B may allow frame member 560 to be removably coupled to a bracket 522 without additional drilling.

Frame member 560 may also include a slot 564. Slot 564 may be a longitudinal opening in a side of frame member 560, for example, in the side of frame member 560 opposite to first notched groove 562A. Slot 564 may include a circular central portion, with a narrower opening. Slot 564 may be configured to receive a portion of a side skirt. Side skirt 510 may include or be coupled to a cylinder, circular rod, bead, or other coupling element 565 that may be positioned within slot 564. For example, side skirt 510 may include or be coupled to two cylinders, circular rods, beads, or other coupling elements, with one coupling element on a top portion of side skirt 510 and another coupling element on a bottom portion of side skirt. In this aspect, slot 564 may form a rail, which may be configured to receive a cylinder or rod, for example, formed of a hard plastic, with fabric or another material that forms a portion of side skirt 510 wrapped around and securely coupled to the cylinder. Once the cylinder is positioned within slot 564, the fabric or material may be extended and tensioned in a direction perpendicular to the cylinder, for example, by pulling another cylinder coupled to side skirt 510. With the fabric or material untensioned, the fabric or material and the cylinder may slide forward or backward within slot 564. As a result, the fabric or material and/or the cylinder that form the side skirt may be removed and moved to a different trailer, replaced with a new side skirt, or otherwise treated or moved without changing or replacing any screw, bolts, or other connectors.

Frame member 560 may also include a channel 566, for example, in a top of frame member opposite to second notched groove. As shown in FIGS. 7C-7E, channel 566 may receive and/or abut one or more tabs 550 of bracket 522, which may help secure frame member 560 relative to bracket 522.

Frame member 560 may also include a hollow central opening 568 and one or more additional interior openings 570, which may help to reduce the overall weight and material of frame member 560. Openings 568, 570 may extending the entire length of frame member 560, or may extend one or more sections of frame member 560. In this aspect, frame member 560 may be coupled to top portion 522A of bracket 522, or may be coupled to bottom portion 522B of bracket 522. For example, frame member 560 may be rotated 180 degrees in order to be used on an opposite side of bracket 522. Additionally, frame member 560 may be formed of aluminum, for example, formed of 6063 extruded aluminum.

FIGS. 7A-7E illustrate additional aspects of skirt system 504. For example, FIGS. 7A-7E illustrate the coupling of frame member 560 and/or side skirt 510 to brackets 522. As shown in FIG. 7A, two frame members 560 may extend along a side of a trailer (not shown) via couplings to a plurality of brackets 522. For example, each frame member 560 may be coupled to top portions 522A and bottom portions 522B of each bracket 522. As shown in FIG. 7B, side skirt 510 may be coupled to frame member 560, for example, via slot 564.

FIGS. 7C-7E illustrate additional aspects of skirt system 504. For example, frame member 560 may be coupled to top portion 522A and bottom portion 522B of bracket 522 via respective coupling elements 580. FIG. 7D shows the coupling of frame member 560 to top portion 522A of bracket 522. Coupling element 580A may extend through opening 554 in top portion 522A (FIGS. 5A and 5C). A portion of coupling element 580A may be received within notched groove 562A. For example, a bolt may be received within the opening of notched groove 562A, and the bolt head may be received into the wider interior portion of notched groove 562A. Additionally, nuts and/or washers may be used to secure the bolt, and thus secure frame member 560 to bracket 522. As shown in FIG. 7D, slot 564 is exposed away from bracket 522 in order to receive a portion of side skirt 510 (FIG. 7B).

FIG. 7E shows the coupling of frame member 560 to bottom portion 522B of bracket 522. Coupling element 580B may extend through opening 554 in ledge 552. A portion of coupling element 580B may be received within groove 562B. For example, coupling element 580B may include a threaded screw and a bolt end within notched groove 562B. As shown in FIG. 7E, slot 564 is exposed away from bracket 522 in order to receive a portion of side skirt 510 (FIG. 7B). Opening 554 in ledge 552 may also be threaded, and coupling element 580B may be adjusted relative to ledge 552 in order to adjust the vertical position of frame member 560 relative to bracket 522. In this manner, and with side skirt 510 coupled to frame member 560 (e.g., via respective slots 564 in two frame members 560), side skirt 510 may be tensioned below a trailer by adjusting coupling element 580B to move the bottom frame member 560 downward. Similarly, side skirt 510 may be untensioned below the trailer and/or removed, replaced, or otherwise disconnected from or moved relative to the trailer. Although not shown, side skirt 510 may include more than one piece of material such that the pieces of material may be individually untensioned and/or partially retracted to form a window or opening in side skirt 510 along a portion of the trailer, for example, to view or inspect a portion of the underside of the trailer.

Moreover, as shown in FIGS. 7C and 7E, skirt system 504 may include one or more support members 582. For example, the one or more support members 582 may extend between brackets 522 on the sides of the trailer, and may provide additional stability and/or bracing against lateral forces or pressures. In one aspect, skirt system 504 may include support members 582 extending below the trailer between each set of longitudinally aligned brackets 522. In another aspect, skirt system 504 may include support members 582 extending below the trailer between a portion of the longitudinally aligned brackets 522, for example, only between every other set of brackets 522, only brackets 522 in a front portion of skirt system 504, only brackets in a rear portion of skirt system 504, etc.

It is noted that brackets 522 may be coupled to left and right sides of a trailer in order to couple the side skirt to the trailer. Additionally or alternatively, brackets 522 may be coupled to the rear of the trailer in order to couple the side skirt to the rear of the trailer, as in FIGS. 1D and 2D.

Figure 8:
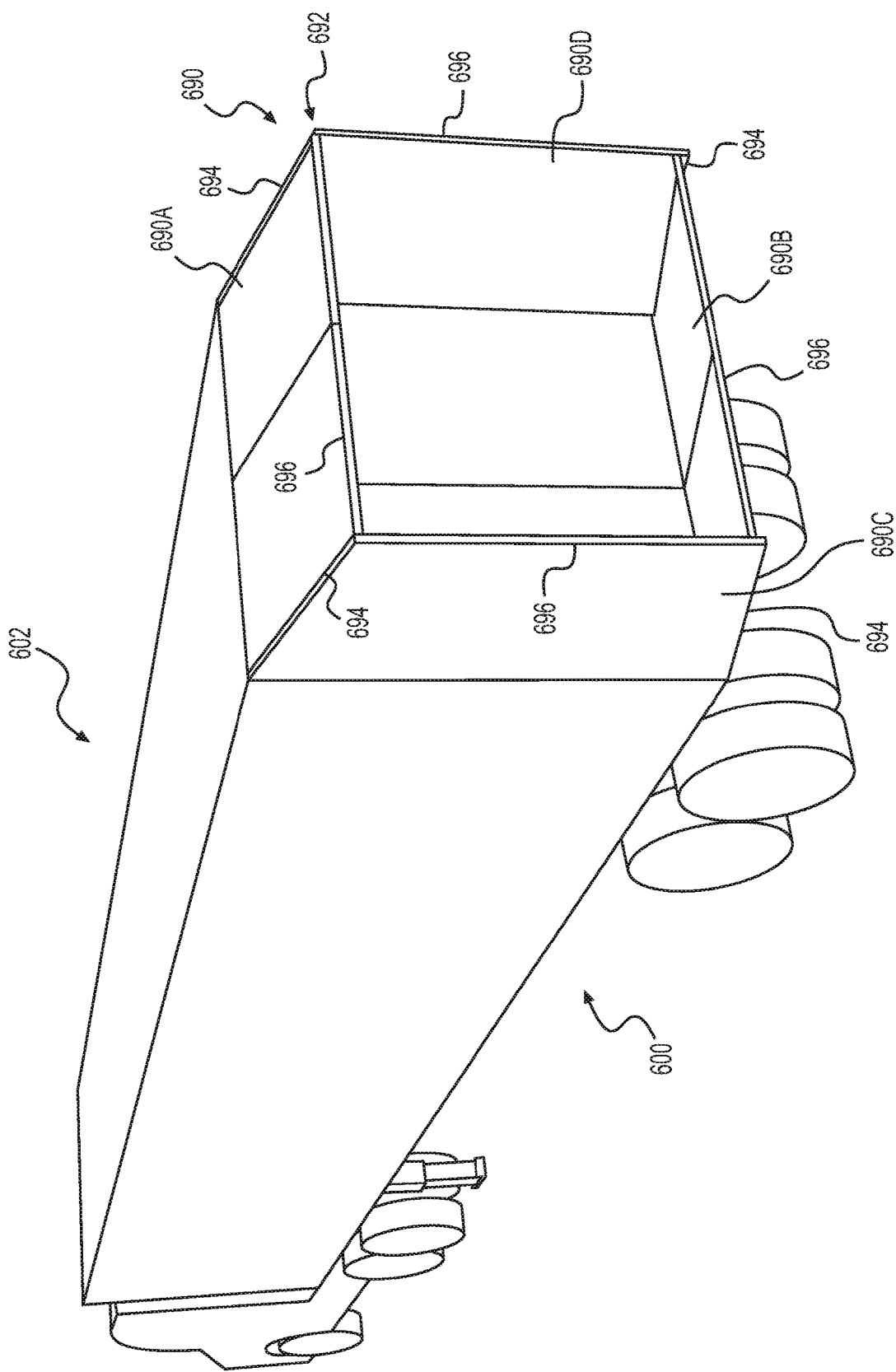
FIGS. 8 and 9 illustrate a perspective view of a rear fairing coupled to a trailer in various configurations, according to aspects of the present disclosure.
Figure 9:
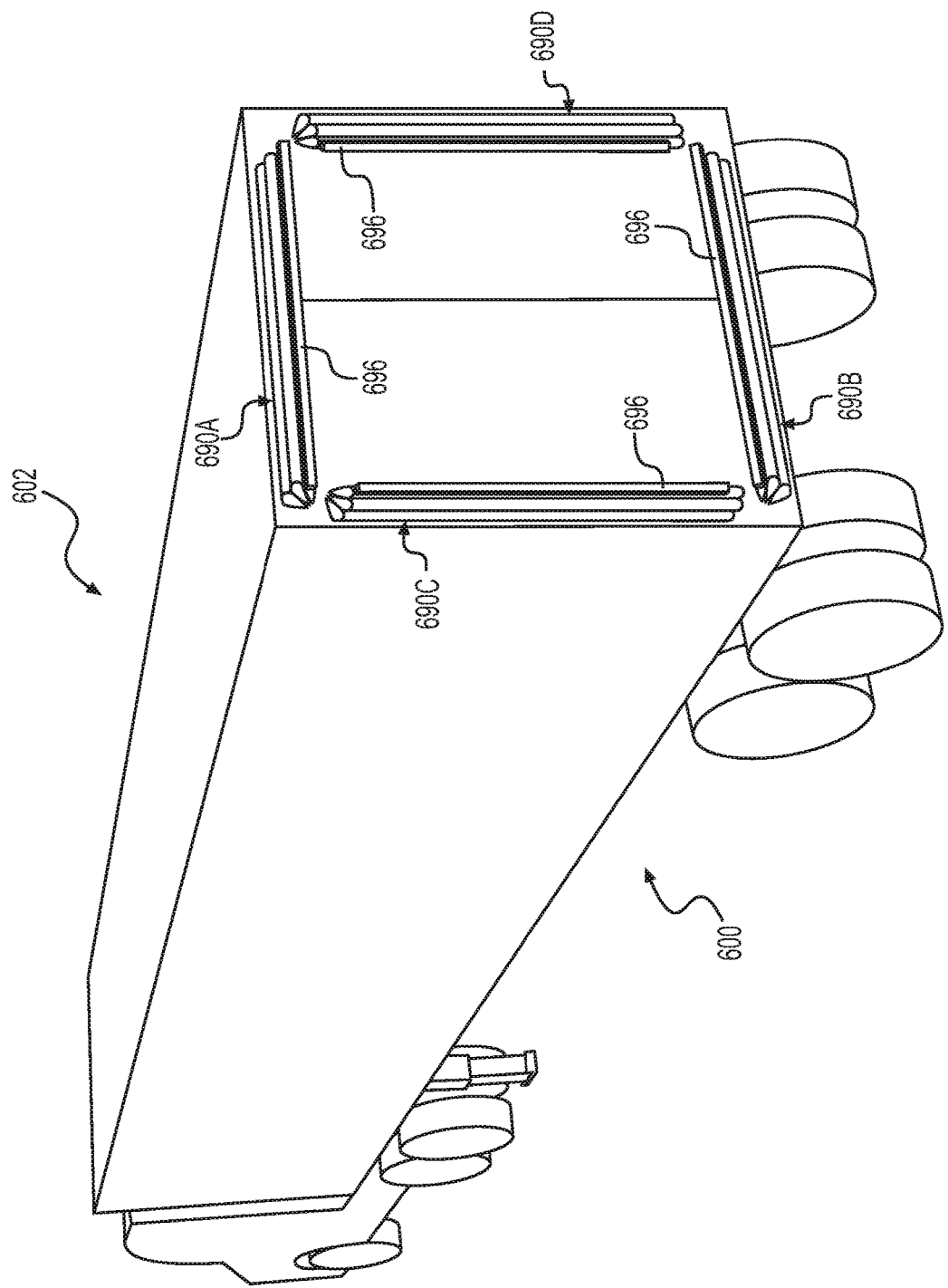

FIGS. 8 and 9 illustrate another aspect of this disclosure. FIGS. 8 and 9 illustrate an alternative example with similar elements to trailer system 100 shown by 500 added to the reference numbers. In one aspect, the undercarriage skirt wall material may be incorporated into one or more rear fairings 690, which may be coupled to a trailer 602 in a trailer system 600. For example, one fairing 690A may extend from the top of the rear of the trailer 602, and one fairing 690B may extend from the bottom of the rear of the trailer 602. One fairing 690C may extend from the left of the rear of the trailer 602, and one fairing 690D may extend from the right of the rear of the trailer 602. FIG. 8 illustrates the fairings 690A-690D in a fully extended arrangement, and the one or more fairings 690A-690D may be held in place and tensioned by a metal frame 692, for example, using one or more telescoping arms 694 similar to the one or more arms discussed above and one or more end posts 696 at the rear portion of fairing 690. FIG. 9 illustrates the fairings 690A-690D in a retracted configuration. The one or more fairings 690A-690D may be extendable and retractable with a manual mechanism (e.g., a hand crank) or electrically powered mechanism (not shown). The one or more fairings 690A-690D may extend approximately five feet to the rear of trailer 602, and may include an approximately 11 degree inward slope.

It is noted that the bracket and frame member assembly discussed with respect to FIGS. 5A-5C, 6, and 7A-7E may be used to vertically tension a side skirt. Although not shown, a similar assembly may be rotated by approximately 90 degrees in order to horizontally tension a side skirt or similar material to form one or more of fairings 690A-690D. For example, one or more brackets and frame members may be coupled the rear of trailer 602. The elements and connections discussed above may be used to couple one or more pieces of material to the rear of trailer 602, and also to tension the one or more pieces of material, for example, to form one or more portions of rear fairing 690

In the extended configuration, as shown in FIG. 8, the one or more fairings 690A-690D may help to reduce the drag. In the retracted configuration, as shown in FIG. 9, the one or more fairings 690A-690D may be positioned on the top, sides, or bottom of the rear face of the trailer 602, for example, in order to allow access to a rear door or doors of trailer 602. Additionally or alternatively, fairings 690A-690D may be retractable to the top, sides, or bottom of the rear portion of trailer 602. For example, in one aspect, bottom rear fairing 690B may be retractable to the rear face of trailer 602, and may further be pivotable to a position below the rear door of trailer 602, which may help provide access to the rear door and/or interior of trailer 602 for loading and/or unloading.

In any of the disclosed examples, reducing drag may help to increase truck freight energy efficiency (reduced fuel burn). Moreover, the described devices, systems and method for coupling an undercarriage skirt or rear fairings to a trailer, for example, may help to decrease drag, while also adding flexibility to the usage of trailers in a fleet. For example, the undercarriage skirt may be made of a pliable material that only achieves a taut and smooth surface when engaged to a predetermined tension. When extended and tensioned, the taut and smooth undercarriage skirt may help to deflect air. Alternatively or additionally, when extended and tensioned, the taut and smooth undercarriage skirt may help to reduce spray and/or splashing.

The undercarriage skirt or rear fairings may be releasably installed on a trailer. The undercarriage skirt or rear fairings may be extended and/or tensioned via a mechanical device that is manual or electrically powered. In one aspect, the mechanical device may automatically tension the undercarriage skirt wall or rear fairings based on sensed information, for example, based on sensed pressure, vehicle speed, or another sensor input. Additionally, the undercarriage skirt wall or rear fairings may be moved or adjusted, for example, to allow access to the underside of the trailer or to the rear door or doors via a manual mechanism or electrical powered mechanical device.

As mentioned above and as shown in the Figures, the undercarriage skirt may extend between the rear tandem wheels and to the front landing gear on one or both sides of the trailer. Alternatively or additionally, the undercarriage skirt may extend to the exterior of the rear tandem wheels, and/or around a rear of the trailer. Furthermore, the undercarriage skirt may wrap around one or both of the landing gear. In an additional aspect, although not shown, the undercarriage skirt may extend to the exterior and/or forward of the front landing gear and around the rear tractor wheels, when the trailer is attached to a tractor. In this aspect, the undercarriage skirt may be coupled to the tractor assembly and may articulate or turn with the tractor assembly. Alternatively, as shown in the Figures, the undercarriage skirt may only be coupled to the trailer assembly.

In any of the aspects mentioned above, the undercarriage assembly may be extendable vertically via a manual or electrically powered mechanism. For example, the undercarriage assembly may be extendable downward or retracted upward manually or automatically based on driving conditions. In one aspect, the undercarriage assembly may extend downward toward the road when the trailer is being pulled at a high speed, for example, on a highway. Alternatively or additionally, the undercarriage assembly may be retracted away from the road when the trailer is being pulled at a low speed or stopped, for example, when operating in a loading dock, a freight intermediary location, or other off-highway location. In these aspects, for example, a controller may be coupled to one or more of coupling elements 580B in order to adjust the tension of side skirt 510.

In a further aspect, any of the aforementioned undercarriage skirt walls or rear fairings may be coupled and uncoupled from a trailer. For example, a user may couple the undercarriage skirt to a first trailer for the duration of the user's usage of that trailer. The user may then uncouple the undercarriage skirt from the first trailer, when not in use or in order to perform maintenance, and recouple the skirt to a second trailer.

As mentioned, the ability of the undercarriage skirt or rear fairings to be retracted or removed, may allow for inspection, maintenance, or access to the components on the underside of the trailer or to the rear door or doors of the trailer. Additionally, the undercarriage skirt may be retracted or removed, and the trailer may be stacked or coupled to another transport device, for example, a train.

Moreover, the undercarriage skirt embodiments discussed above may increase the length and width of the undercarriage skirt in operation when coupled to a tractor, further improving fuel efficiency performance of the skirt. Such characteristics may help to increase payback time.

While principles of the present disclosure are described herein with reference to illustrative examples for particular applications, it should be understood that the disclosure is not limited thereto. Those having ordinary skill in the art and access to the teachings provided herein will recognize additional modifications, applications, embodiments, and substitution of equivalents all fall within the scope of the features described herein. Accordingly, the claimed features are not to be considered as limited by the foregoing description.

What is claimed is:

1. A vehicle assembly for transporting freight, comprising:
   a frame of the vehicle assembly including a first side, a second side, and a longitudinal axis positioned between the first side and the second side;
   a frame member mounted to one of the first side or the second side of the frame at a location outboard from one or more rear wheels, the frame member including a slot oriented parallel to the longitudinal axis of the frame and having an opening facing outwardly from the one of the first side and the second side of the frame; and
   at least one undercarriage skirt formed of a pliable material and including a length and a coupling element, the coupling element configured to be slidably received in the slot such that the at least one undercarriage skirt is movable between a first position in which the at least one undercarriage skirt is positioned laterally outward from the one or more rear wheels, and a second position in which at least a portion of the one or more rear wheels are exposed, wherein the at least one undercarriage skirt is retractable in a direction parallel to the longitudinal axis of the frame to move from the first position to the second position.

2. The vehicle assembly of claim 1, wherein the at least one undercarriage skirt is coupled to the frame via a plurality of brackets mounted to the one of the first side or the second side of the frame, the frame member is a first frame member, and further comprising a second frame member having an opening facing outwardly from the other of the first side and the second side of the frame, the first and second frame members respectively connected to either a top or a bottom portion of each bracket.

3. The vehicle assembly of claim 2, wherein the first and second frame members include the same configuration of grooves and slots, and wherein the first and second frame members include one or more central or internal openings that extend longitudinally within the frame members.

4. The vehicle assembly of claim 3, wherein the brackets include one or more extensions to couple the brackets to the frame.

5. The vehicle assembly of claim 3, wherein the brackets include one or more tabs in the top and bottom portions, and wherein the two frame members include channels configured to receive at least one of the one or more tabs.

6. The vehicle assembly of claim 3, wherein the brackets include one or more openings configured to receive a coupling member, wherein the frame members each include one or more grooves configured to lockably receive the coupling member.

7. The vehicle assembly of claim 6, wherein tightening the coupling member that couples the frame member to the bottom portion of the bracket is configured to tension the fabric or pliable material.

8. A vehicle assembly for transporting freight, comprising:
a frame of the vehicle assembly including a first side, a second side, and a longitudinal axis positioned between the first side and the second side;
a frame member clamped to one of the first side or the second side of the frame by a bracket at a location outboard from one or more rear wheels, the frame member including a slot oriented parallel to the longitudinal axis of the frame and having an opening facing outwardly from the one of the first side and the second side of the frame; and
at least one undercarriage skirt wall formed of a pliable material and including a length and a coupling element extending at least partially along the length, the coupling element being slidably received in the slot such that the undercarriage skirt wall is movably coupled to the frame member.

9. The vehicle assembly of claim 8, wherein the at least one undercarriage skirt extends around at least a portion of a bottom perimeter of the frame including at least one rear wheel.

10. The side skirt system of claim 8, the bracket having a clamp that couples the frame member to one of the first side or the second side of the frame.

11. The side skirt system of claim 8, wherein a mechanical device is configured to apply tension to the undercarriage skirt wall such that the at least one undercarriage skirt wall becomes taut and smooth when tension is applied thereto.

12. A side skirt system for a vehicle assembly for transporting freight, the vehicle assembly having a first side, a second side, and a longitudinal axis positioned between the first side and the second side, the system, comprising:
a side skirt formed of a pliable material, the side skirt including a length and a coupling element extending at least partially along the length;
a coupling mechanism configured to couple the side skirt to one of the first side and the second side of the vehicle assembly, the coupling mechanism including a slot oriented parallel to the longitudinal axis of the vehicle and having an opening facing outwardly from the one of the first side and the second side of the vehicle, the slot being configured to slidably receive the coupling element of the side skirt.

13. The side skirt system of claim 12, wherein the coupling mechanism includes
a bracket configured to be coupled to the one of the first side and the second side of the vehicle; and
a frame member coupled to the bracket, the frame member including the slot.

14. The side skirt system of claim 13, wherein the bracket includes a top portion and a bottom portion, wherein each of the top portion and the bottom portion include at least one tab that extends away from the bracket, and the frame member includes a channel configured to receive at least a portion of one tab that extends away from portions of the bracket.

* * * * *